United States Patent
Yu et al.

(10) Patent No.: US 8,699,590 B2
(45) Date of Patent: Apr. 15, 2014

(54) EFFICIENT OFDM PEAK REDUCTION ALGORITHM

(75) Inventors: Chunyang Yu, Cambridge (GB); Andrei Popescu, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 420 days.

(21) Appl. No.: 13/052,502

(22) Filed: Mar. 21, 2011

(65) Prior Publication Data

US 2011/0235760 A1  Sep. 29, 2011

(30) Foreign Application Priority Data

Mar. 29, 2010 (GB) .................................. 1005162.1

(51) Int. Cl.
*H04B 1/10* (2006.01)

(52) U.S. Cl.
USPC ........................................ 375/260; 375/297

(58) Field of Classification Search
USPC .......... 375/296, 297, 260, 346; 370/208, 203; 455/63.1
See application file for complete search history.

(56) References Cited

U.S. PATENT DOCUMENTS

| | | | | |
|---|---|---|---|---|
| 2002/0191705 A1* | 12/2002 | Melsa et al. | ................... | 375/295 |
| 2004/0218689 A1* | 11/2004 | Akhtman | ...................... | 375/296 |
| 2005/0100108 A1* | 5/2005 | Yun et al. | ...................... | 375/260 |
| 2005/0163248 A1* | 7/2005 | Berangi et al. | ................ | 375/296 |
| 2007/0140101 A1* | 6/2007 | Guo et al. | ...................... | 370/204 |
| 2008/0013646 A1* | 1/2008 | Hamada et al. | ................ | 375/297 |
| 2008/0101487 A1* | 5/2008 | Muck et al. | .................... | 375/260 |
| 2008/0137767 A1* | 6/2008 | Jaenecke | ........................ | 375/267 |
| 2008/0298490 A1* | 12/2008 | Yun et al. | ...................... | 375/260 |
| 2009/0060073 A1* | 3/2009 | Yano et al. | ..................... | 375/260 |
| 2009/0103639 A1* | 4/2009 | Sankabathula et al. | ....... | 375/260 |
| 2010/0150256 A1* | 6/2010 | Morris et al. | ................. | 375/260 |

OTHER PUBLICATIONS

Richard Van Nee et al., "Reducing the Peak-to-Average Power Ratio of OFDM", Vehicular Technology Conference, 1998, VTC'98, p. 2072-2076.
Davide Dardari et al., "A Theoretical Characterization of Nonlinear Distortion Effects in OFDM Systems", IEEE Transactions on Communications, vol. 48, No. 10, Oct. 2000, p. 1755-1764.
Xiaodong Li et al., "Effects of Clipping and Filtering on the Performance of OFDM", IEEE Communications Letters, vol. 2, No. 5, May 1998, p. 131-133.
Chin-Liang Wang et al., "A Peak-to-Average Power Ratio Reduction Technique for the IEEE 802.11a Wireless LAN", Proceedings of the 2003 IEEE Vehicular Technology Conference, Oct. 2003, p. 2287-2291.
Carole A. Devlin et al., "Peak to Average Power Ratio Reduction Technique for OFDM Using Pilot Tones and Unused Carriers", IEEE Radio and Wireless Symposium, 2008, p. 33-36.

* cited by examiner

*Primary Examiner* — Aristocratis Fotakis
(74) *Attorney, Agent, or Firm* — RatnerPrestia (57) ABSTRACT

An efficient method of OFDM peak reduction is described. In an embodiment, a set of the most significant peaks in a symbol of an OFDM signal are identified and then, for each identified peak, a shifted and scaled version of a template cancellation signal is subtracted from the OFDM signal. The template cancellation signal is shifted such that its peak aligns with the identified peak and it is scaled such that it has the opposite phase to the identified peak. No iterative peak search and cancellation is involved in peak reduction, i.e. a cancellation step is not followed by another peak search for the same OFDM symbol. The process is repeated for each symbol in turn and in some embodiments the OFDM signal is up-sampled before it is analyzed to identify the most significant peaks.

17 Claims, 9 Drawing Sheets

EFFICIENT OFDM PEAK REDUCTION ALGORITHM

BACKGROUND

Orthogonal frequency division multiplexing (OFDM) is a modulation scheme which divides a frequency band into a number of equally spaced frequency subcarriers (or tones) and data is then modulated onto these subcarriers. OFDM is used in wireless local area networks (WLAN), digital video broadcasting (DVB), digital audio broadcasting (DAB) etc., because of its high spectral efficiency, high data rate capability and resistance to multipath fading. However, OFDM suffers from a large peak-to-average-power-ratio (PAPR) problem: when the number of subcarriers is large, contributions from these subcarriers may coherently add together to form large peaks, which are well above the mean amplitude level.

The high PAPR value causes difficulties in power amplifier (PA) design. If the PA back-off is less than the PAPR value, nonlinearity of the PA (especially clipping) can cause in-band and out-of-band distortion. Out-of-band distortion causes spectral splatter which increases adjacent channel interference while in-band distortion reduces the modulation accuracy of the transmitted signal. On the other hand, if the PA back-off is higher than the PAPR value, PA power efficiency is reduced significantly.

Digital signal processing of the baseband OFDM signal can be used to reduce its PAPR value and a number of algorithms have been proposed which can be divided into three categories. Those PAPR reduction algorithms in the first category use redundant coding, i.e. they select codewords with low PAPR values for transmission by exploiting the redundancy of codewords; however this involves high computation complexity to search for suitable codewords and therefore the technique is more suitable for scenarios with small numbers of subcarriers (where the problem of PAPR is not serious). Furthermore, this is not suitable to implement communication standards that do not provide the required codeword redundancy. The second category of algorithms reduce PAPR by clipping the baseband signal amplitude from the output of the inverse fast Fourier transform (IFFT); however, this causes serious adjacent channel interference (ACI). Algorithms in a third category perform peak cancellation using unused subcarriers and either require multiple FFT/IFFT blocks or iterative processing with long latency and high complexity.

As described above, the existing algorithms for performing PAPR reduction either introduce serious interference and distortion or result in significant implementation complexity and processing latency. Many communication standards (e.g. the IEEE 802.11 standard) require transmissions to occur within a limited time after their payload is known to the transmitter, which makes algorithms with high complexity and long processing latency impractical for real-time implementation.

The embodiments described below are not limited to implementations which solve any or all of the disadvantages of known methods of peak reduction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An efficient method of OFDM peak reduction is described. In an embodiment, a set of the most significant peaks in a symbol of an OFDM signal are identified and then, for each identified peak, a shifted and scaled version of a template cancellation signal is subtracted from the OFDM signal. The template cancellation signal is shifted such that its peak aligns with the identified peak and it is scaled such that it has the opposite phase to the identified peak. No iterative peak search and cancellation is involved in peak reduction, i.e. a cancellation step is not followed by another peak search for the same OFDM symbol. The process is repeated for each symbol in turn and in some embodiments the OFDM signal is up-sampled before it is analyzed to identify the most significant peaks.

A first aspect provides a method of peak reduction of an OFDM signal, the method comprising: identifying at least one peak in a symbol of the OFDM signal; for each identified peak, generating a cancellation signal by shifting and scaling a pre-computed cancellation waveform; and generating a modified OFDM signal by subtracting the cancellation signals from the OFDM signal.

The at least one peak may comprise a plurality of peaks.

The pre-computed cancellation waveform may comprise a signal envelope which decays with increasing distance from a peak of the waveform.

The pre-computed cancellation waveform may comprise two sample values adjacent to the peak, the sample values being substantially equal to zero.

The pre-computed cancellation waveform may be substantially symmetrical about the peak.

The pre-computed cancellation waveform may comprise a DC component.

The method may further comprise: up-sampling the OFDM signal before identifying the at least one peak and wherein the modified OFDM signal is generated by subtracting the cancellation signals from the up-sampled OFDM signal.

The at least one peak may comprise a set of M most significant peaks in the symbol, where M is an integer.

Identifying the set of M most significant peaks in the symbol may comprise: on receipt of a sample from the symbol, comparing an amplitude of the sample with stored data, the stored data comprising an amplitude, sample position and index for each of M peaks, wherein the index defines an order of the M peaks according to the amplitude of each of the peaks; and if the amplitude of the sample is larger than one or more stored values, deleting the stored data for the one of the M peaks having the smallest amplitude, storing the amplitude of the sample and sample position and updating the index for each of the stored peaks.

The method may further comprise: storing the sample in a buffer; and wherein the cancellation signals are generated once all samples from the symbol have been received and stored in the buffer.

Generating a cancellation signal by shifting and scaling a pre-computed cancellation waveform may comprise: cyclically shifting the pre-computed cancellation waveform such that the peak of the pre-computed cancellation waveform is aligned to the identified peak; and scaling a resulting waveform by a complex number such that it has an opposite phase to the identified peak and an amplitude which corresponds to an amplitude of the identified peak.

The complex number may have the form:

$$\alpha(v_p(m)) = \begin{cases} 0 & \text{if } |v_p(m)| \le T_0 \\ \frac{v_p(m)}{|v_p(m)|}(|v_p(m)| - T_0) & \text{otherwise} \end{cases}$$

where $v_p(m)$ is a complex value of the identified peak and $T_0$ is a pre-defined threshold, or the complex number may have the form:

$$\alpha(v_p(m)) = \begin{cases} 0 & \text{if } |v_p(m)| \le T_0 \\ r_i v_p(m) & \text{if } (T_0 + (i-1)\Delta T) < |v_p(m)| \le (T_0 + i\Delta T) 1 \le i \le (K-1) \\ r_K v_p(m) & \text{otherwise} \end{cases}$$

Where $\{r_i | 1 \le i \le K\}$ are piecewise constant approximations of $$\frac{|v_p(m)| - T_0}{|v_p(m)|},$$

K is the number of approximations and $\Delta T$ is a step size.

The OFDM signal may comprise a 20 MHz or 40 MHz bandwidth 802.11n OFDM signal. In further examples, the OFDM signal may comprise a different bandwidth signal such as a 80 MHz or 160 MHz signal.

Where the OFDM signal comprises a 20 MHz bandwidth 802.11N OFDM signal, the pre-computed cancellation waveform in the time domain may be defined by:

$$h(k) = \sum_{m=1}^{128} H(m) \exp\left(j \frac{2\pi}{128}(k-1)(m-65)\right)$$

where:

$$H(m) = \begin{cases} 1 & m = 1 \\ 10^{0.045 A\left(\frac{20}{64}(m-1)\right)} & 31 \le m \le 50 \\ 10^{0.045 A\left(\frac{20}{64}(m-129)\right)} & 80 \le m \le 99 \\ 0 & \text{otherwise} \end{cases}$$

and where $j=\sqrt{-1}$, A is a spectrum mask of an 802.11n 20 MHz bandwidth signal (e.g. as defined in the 802.11-2009 standard), m is a subcarrier number and k is a sample number in the symbol.

A second aspect provides an apparatus for peak reduction of an OFDM signal, the apparatus comprising: a sorting element arranged to identify at least one peak in a symbol of a received OFDM signal; a processing element arranged to generate a cancellation signal for each identified peak by shifting and scaling a pre-computed cancellation waveform; and further arranged to generate a modified OFDM signal by subtracting the cancellation signals from the received OFDM signal; and an output arranged to output the modified OFDM signal.

The apparatus may further comprise: an interpolation filter arranged to up-sample an input OFDM signal and output an up-sampled OFDM signal to the sorting and processing elements and wherein the received OFDM signal is the up-sampled OFDM signal.

A third aspect provides an OFDM modem comprising an apparatus described above.

A fourth aspect provides a method comprising: receiving an input OFDM signal; up-sampling the input OFDM signal to generate an up-sampled OFDM signal; identifying at least one peak in a symbol of the up-sampled OFDM signal; generating a cancellation signal for each identified peak by shifting and scaling a template cancellation waveform; generating a modified OFDM signal by subtracting the cancellation signals from the up-sampled OFDM signal; and outputting the modified OFDM signal.

The input OFDM signal may comprise a 802.11n OFDM signal.

The template cancellation waveform may comprise: a signal envelope which decays with increasing distance from a peak of the waveform; and two samples adjacent to the peak having values substantially equal to zero.

A fifth aspect provides a method of peak reduction of an OFDM signal substantially as described with reference to any of FIGS. 1, 2, 4 and 5 of the drawings.

A sixth aspect provides an apparatus for peak reduction of an OFDM signal substantially as described with reference to FIG. 6 of the drawings.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
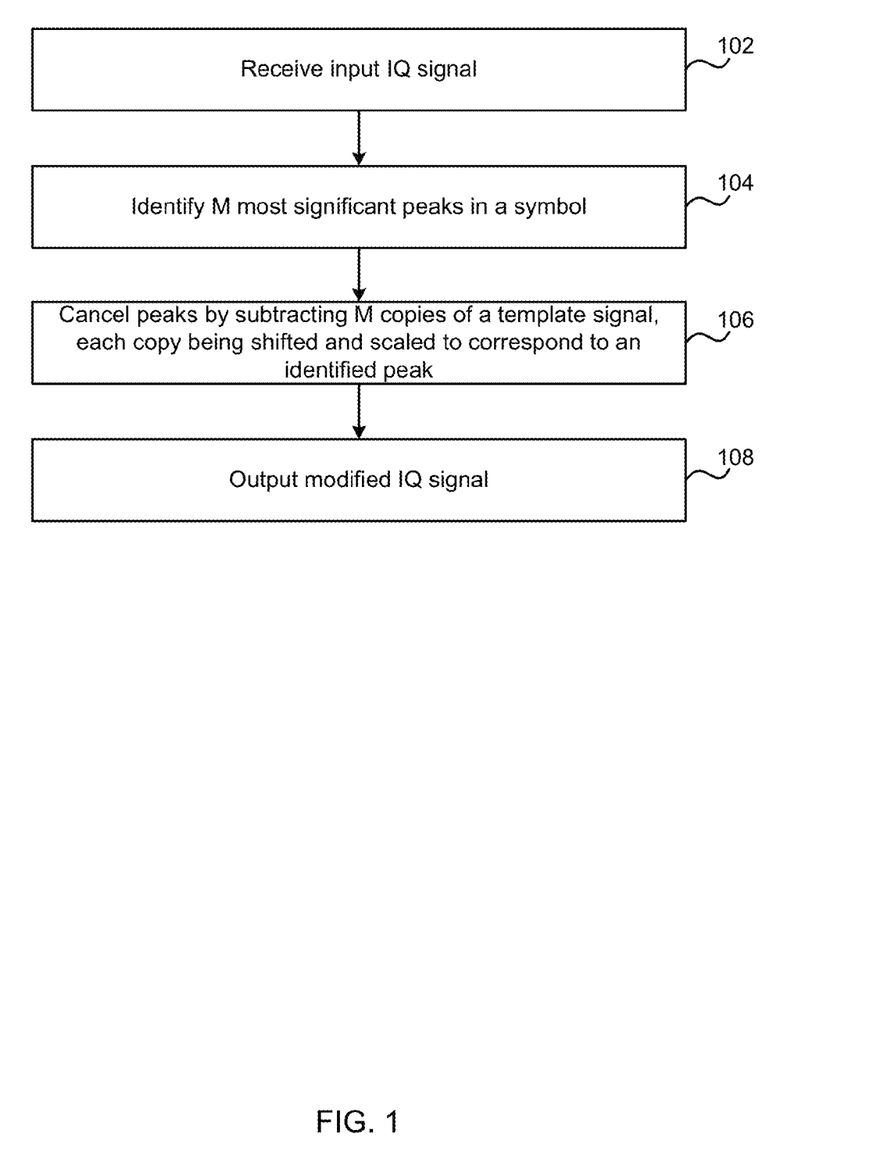
FIGS. 1 and 2 are flow diagrams of example methods of peak reduction of an OFDM signal.

FIG. 1 is a flow diagram of an example method of peak reduction of an OFDM signal. This method has low complexity and low latency and is therefore suitable for real-time digital implementation. The input signal (which may be the baseband signal) is received (block 102) and the M most significant peaks in a symbol are identified (block 104), where M is an integer (e.g. M=4). These peaks are then cancelled (in block 106) by subtracting M copies of a pre-computed template cancellation signal where each copy of the template cancellation signal has been shifted (i.e. cyclically shifted) and scaled to correspond to a different one of the identified peaks. The modified signal can then be output (block 108). The method can be repeated so that symbol by symbol the peaks in the OFDM signal are cancelled sequentially.

In an embodiment, the most significant peaks (which are identified in block 104) are the peaks with the largest amplitude in the symbol. In other embodiments, other criteria may be applied, e.g. peaks that are located in certain parts of the symbol may be considered less important and may be given less weight than other peaks when determining the most significant peaks. Receivers typically sample the OFDM symbols starting well into the guard interval and as a result the first samples in the guard interval contribute less to Error Vector Magnitude (EVM). In an embodiment of the method shown in FIG. 1, these first samples in the guard interval may be ignored or attributed less weight when identifying the M most significant peaks (in block 104).

The method shown in FIG. 1 generates a set of cancellation signals for the most significant peaks within a symbol of an OFDM signal (in block 106). The fast Fourier transform (FFT) of these cancellation signals has zero values on data subcarriers (used subcarriers) and nonzero values on the unused subcarriers. The term 'data subcarriers' refers to both payload data subcarriers and pilot subcarriers. The positions of the peaks of these cancellation signals are identical (or substantially identical) to the most significant peak positions of the OFDM symbol but with opposite phases and appropriate amplitudes; therefore these most significant peaks values are reduced. In an embodiment, the appropriate amplitude of a cancellation signal is proportional to the difference between peak amplitude and threshold value (i.e. $|\alpha(v_p(m))|$ using the notation set out below).

Figure 2:
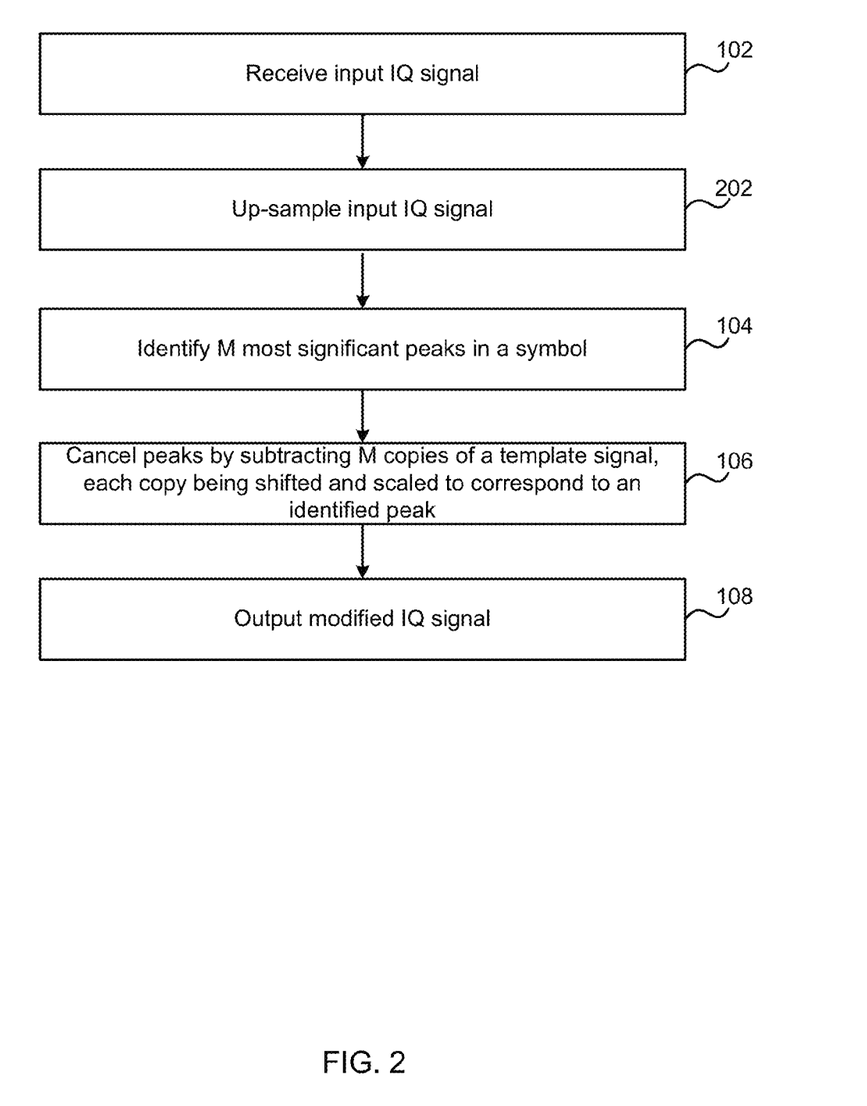

FIG. 2 is a flow diagram of another example method of peak reduction of an OFDM signal. This method is as shown in FIG. 1 with an additional step that the input signal is up-sampled (block 202) before it is processed (in blocks 104 and 106). In an example, a 20 MHz 802.11n OFDM signal may be interpolated (in block 202) to generate a 40 MHz signal and the peak cancellation is carried out on the interpolated 40 MHz signal. In other examples, the input signal may have a different bandwidth (e.g. a 40 MHz signal which is up-sampled to 80 MHz) and/or different up-sampling factors may be used. In an example implementation, the up-sampling (in block 202) is performed in hardware (in a silicon chip), however in other implementations the up-sampling may be performed in software and as shown in FIG. 1, in some implementations, up-sampling may not occur (e.g. for very high bandwidth signals). In the following description, any reference to a 20 MHz 802.11n OFDM signal is by way of an example only.

Assuming use of an FFT length equal to the number of samples in an OFDM symbol, increasing the sampling rate (e.g. from 20 MHz to 40 MHz), increases the number of unused frequency bins (there are only 8 unused subcarriers at a sampling rate of 20 MHz for HT-MM and HT-GF formats) which gives more flexibility for designing cancellation signals. Additionally, processing the data at a higher sampling rate mitigates the peak regrowth, as described below.

In an experiment, 1000 HT-MM MCS 7 (OFDM) packets were generated at a sampling frequency of 20 MHz with each packet containing 4000 bytes of random data. These signals were then up-sampled to 40 MHz, 80 MHz and 160 MHz and the respective PAPR values calculated. The PAPR value for these packets may be defined as $$PAPR = \frac{\max_{n=1}^{N}|s(n)|}{\sqrt{\frac{1}{N}\sum_{n=1}^{N}|s(n)|^2}} \quad (1)$$

Where s(n) is the input signal in the time domain, n is the sample index and N is the number of samples in a packet. The results show that for each packet, the PAPR value increases with sampling frequency, but the growth from 20 MHz to 40 MHz sample rate is the more apparent.

The up-sampling may be performed (in block 202) using an interpolation filter having a short length, without long ringing, while maintaining the spectral flatness of the original signal with low aliasing. Use of such a filter reduces inter symbol interference (ISI). By selection of an appropriate filter, the peak cancellation can be made independent of any further filters which are subsequently applied to the output signal (i.e. such that the cancelled peaks do not regrow).

The template cancellation signal used to cancel the peaks (in block 106 of FIGS. 1 and 2) is a pre-computed waveform in the time domain. An example of a template cancellation signal for a 20 MHz bandwidth IEEE 802.11n or 802.11a signal is shown in the first graph 300 in FIG. 3 and an example of a template cancellation signal for a 40 MHz bandwidth IEEE 802.11n signal is shown in the second graph 301. In the 20 MHz example (graph 300), the template cancellation signal is a real signal with 128 samples and the maximum peak occurs at the centre (sample 64). In the 40 MHz example (graph 301), the template cancellation signal is a real signal with 256 samples and again the maximum peak occurs at the centre (sample 128). Further details of these particular template cancellation signals are provided below.

In general, the template cancellation signal (used in block 106) has a signal envelope which decays with increasing distance from the peak (i.e. the amplitude value is attenuated with increasing distance from the peak). This characteristic, which may be referred to as the localized feature of the template cancellation signal, has the effect that the probability of generating another, even higher, peak while reducing the current peak is low.

The cancellation signals (which are subtracted in block 106) are generated from the template cancellation signal (which may alternatively be referred to as the mother cancellation signal) by cyclically shifting the template cancellation signal so that the peak is located in a desired position (i.e. it corresponds to the position of one of the most significant peaks identified in block 104) and by scaling the resulting signal by a complex number, so that it has a desired phase and amplitude (i.e. so that it cancels the particular identified peak).

Figure 3:
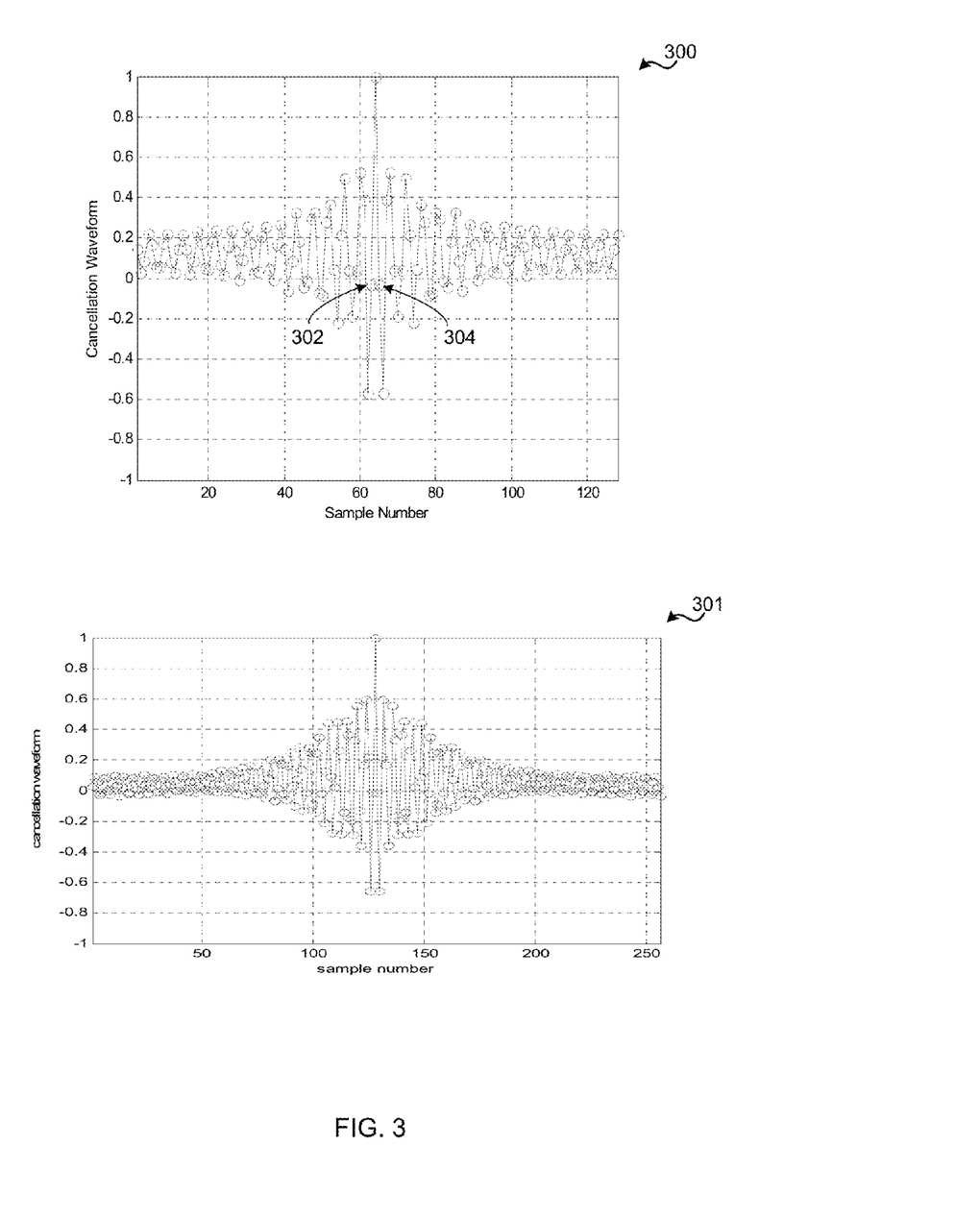
FIG. 3 shows graphs of two example template cancellation signals.

Another feature of the template cancellation signal, in some embodiments, is that the two adjacent sample values around the peak are close to zero (e.g. as indicated by the circles labeled 302, 304 in the first graph 300 in FIG. 3). Where the signal is oversampled (e.g. as in the method of FIG. 2), the two adjacent samples around the peak in an OFDM symbol also might have high amplitudes. By making cancellation values close to zero at these two samples, the probability of generating unexpected peaks is reduced.

In some embodiments, the template cancellation signal may be substantially symmetrical around the peak position and/or have a DC component. Where the template cancellation signal is symmetrical it is possible to store only half of the signal, which makes the method simpler and reduces memory requirements. Where the template has a DC component, this provides an extra degree of freedom when scaling the template cancellation signal in order to ensure that the sample values adjacent to the peak are zero (or substantially zero). These additional features of the template cancellation signal are also shown in the examples of FIG. 3.

The example template cancellation signals shown in FIG. 3 may be derived as follows:

Assuming the spectrum mask is A(f), it is defined by the standard (IEEE 802.11n-2009 amendment) as, $$A(f)(dB) = \begin{cases} 0 & |f| \le 9 \\ -10(|f| - 9) & 9 < |f| \le 11 \\ -20 - \frac{8}{9}(|f| - 11) & 11 < |f| \le 20 \\ -28 - \frac{17}{10}(|f| - 20) & 20 < |f| \le 30 \\ -45 & |f| > 30 \end{cases} \quad (2a)$$

for 20 MHz bandwidth $$A(f)(dB) = \begin{cases} 0 & |f| \le 19 \\ -10(|f| - 19) & 19 < |f| \le 21 \\ -20 - \frac{8}{19}(|f| - 21) & 21 < |f| \le 40 \\ -28 - \frac{17}{10}(|f| - 40) & 40 < |f| \le 60 \\ -45 & |f| > 60 \end{cases} \quad (2b)$$

for 40 MHz bandwidth

In the above expressions, the unit for variable f is MHz.

The frequency domain representation of the template cancellation signal for all subcarriers is expressed in one of the equations (3a)-(3f) below (phase is zero), where m is a frequency bin number and A is the spectrum mask as given by equation (2a) or (2b) above. The different equations (3a)-(3f) relate to different frequency signals (e.g. 20 or 40 MHz) and/or different modes (e.g. non-HT or legacy modes, HT modes, duplicate modes, top/bottom 20 MHz of a 40 MHz signal, etc). In some examples the frequency bins may correspond to subcarriers.

$$H(m) = \begin{cases} 1 & m = 1 \\ 10^{0.045 A(\frac{20}{64}(m-1))} & 31 \le m \le 50 \\ 10^{0.045 A(\frac{20}{64}(m-129))} & 80 \le m \le 99 \\ 0 & \text{otherwise} \end{cases} \quad (3a)$$

for 20 MHz HT modes $$H(m) = \begin{cases} 1 & m = 1 \\ 10^{0.045 A(\frac{20}{64}(m-1))} & 28 \le m \le 50 \\ 10^{0.045 A(\frac{20}{64}(m-129))} & 79 \le m \le 101 \\ 0 & \text{otherwise} \end{cases} \quad (3b)$$

for 20 MHz HT non-HT modes $$H(m) = \begin{cases} 1 & m = 1 \\ 0.25 & m = 2 \text{ or } m = 256 \\ 10^{0.05 A(\frac{40}{128}(m-1))} & 60 \le m \le 102 \\ 10^{0.05 A(\frac{40}{128}(m-1))} & 156 \le m \le 198 \\ 0 & \text{otherwise} \end{cases} \quad (3c)$$

for 40 MHz HT modes (exclude MCS32)

$$H(m) = \begin{cases} -1.25 & m = 1 \\ 0.5 & m = 2 \text{ or } m = 256 \\ 0.25 & m = 3 \text{ or } m = 255 \\ 0.125 & m = 4 \text{ or } m = 254 \\ 10^{0.05 A(\frac{40}{128}(m-1))} & m = 33 \text{ or } 60 \le m \le 102 \\ 10^{0.05 A(\frac{40}{128}(m-129))} & m = 255 \text{ or } 156 \le m \le 198 \\ 0 & \text{otherwise} \end{cases} \quad (3d)$$

for MCS32 and duplicate non-HT modes $$H(m) = \begin{cases} 10^{0.05 A(\frac{40}{128}(m-1))} & 62 \le m \le 102 \\ 10^{0.05 A(\frac{40}{128}(m-129))} & 156 \le m \le 196 \\ 0 & \text{otherwise} \end{cases} \quad (3e)$$

for 20 MHz HT in upper or lower 40 MHz channel $$H(m) = \begin{cases} 10^{0.05 A(\frac{40}{128}(m-1))} & 60 \le m \le 102 \\ 10^{0.05 A(\frac{40}{128}(m-129))} & 156 \le m \le 198 \\ 0 & \text{otherwise} \end{cases} \quad (3f)$$

for 20 MHz non-HT in upper or lower 40 MHz channel

The time-domain signal, h(k), is derived by one of the following IFFTs:

$$h(k) = \sum_{m=1}^{128} H(m) \exp\left(j \frac{2\pi}{128}(k-1)(m-65)\right) \quad (4a)$$

for 20 MHz signal, k = 1, 2 ... 128

$$h(k) = \sum_{m=1}^{256} H(m) \exp\left(j \frac{2\pi}{256}(k-1)(m-129)\right) \quad (4b)$$

for 40 MHz signal, k = 1, 2 ... 256

$j = \sqrt{-1}$. Finally, h is normalized to make h(64)=1 for 20 MHz and h(128)=1 for 40 MHz.

It will be appreciated that the above derivations of example template cancellation signals is by way of example only. The methods described herein may be applied to signals other than 20 MHz and 40 MHz IEEE 802.11n signals, e.g. 80 MHz or 160 MHz signals, and alternative template cancellation signals may be generated to meet the appropriate spectral mask.

As described above, multiple peaks are reduced in a single iteration (in block 106) which reduces processing latency. In an embodiment, the M most significant peaks within an OFDM symbol may be reduced in a single iteration using the following algorithm:

$$\acute{s}(n) = s(n) - \sum_{m=1}^{M} \alpha(v_p(m))h(\mathrm{mod}(n - n_p(m) + 63, 128) + 1) \quad (5)$$

In the above expression, the term $$\sum_{m=1}^{M} \alpha(v_p(m))h(\mathrm{mod}(n - n_p(m) + 63, 128) + 1)$$

is the cancellation signal which comprises a weighted sum of the M template cancellation signals, where the peak position of the template waveform is aligned with the $64^{th}$ sample, the weight $\alpha(v_p(m))$ performs the scaling and phase rotation of the template cancellation signal and where the modulo 128 takes into consideration the cyclical rotation of the template cancellation signal. M is the number of peaks to be reduced, with m being the index of a peak to be reduced (where m= 1, ..., M). $v_p(m)$ is the complex value of the $m^{th}$ peak, and $n_p(m)$ is the position of the $m^{th}$ peak within the symbol. s(n) is the signal being processed (which may be the input signal or an up-sampled version of the input signal) and $\acute{s}(n)$ is the modified signal (e.g. as output in block 108).

The value of the weight $\alpha(v_p(m))$ may be calculated using:

$$\alpha(v_p(m)) = \begin{cases} 0 & \text{if } |v_p(m)| \leq T_0 (\text{threshold}) \\ \frac{v_p(m)}{|v_p(m)|}(|v_p(m)| - T_0) & \text{otherwise} \end{cases} \quad (6)$$

The peak cancellation computation described above requires two multiplications and one division as shown in equations (5) and (6) above. In an optimization, which simplifies the algorithm and reduces computational complexity, the division operation is approximated by a set of ratios:

$$\alpha(v_p(m)) = \quad (7)$$
$$\begin{cases} 0 & \text{if } |v_p(m)| \leq T_0 \\ r_i v_p(m) & \text{if } (T_0 + (i-1)\Delta T) < |v_p(m)| \leq (T_0 + i\Delta T) \quad 1 \leq i \leq (K-1) \\ r_K v_p(m) & \text{otherwise} \end{cases}$$

Where $\{r_i | 1 \leq i \leq K\}$ are piecewise constant approximations of $$\frac{|v_p(m)| - T_0}{|v_p(m)|},$$

K is the number of approximation, $\Delta T$ is a step size. $\{r_i | 1 \leq i \leq K\}$ can be chosen so that multiplication with it is replaced with two or three additions. Only one multiplication is needed.

Known iterative peak reduction algorithms normally require multiple iterations with two operations per iteration: (1) finding the highest peak and its position within a symbol; (2) reducing the highest peak. This can cause significantly higher processing latency and complexity than the algorithm described herein (e.g. as shown in equation (5)). The multi-peak reduction capability of the algorithm described herein is a result of the localized feature of the template cancellation signal.

In an embodiment, peak reduction processing (block 106) starts after all samples within a symbol have been buffered and the M most significant peaks and their positions identified (in block 104). In an optimization of any of the peak reduction methods described above (e.g. the method of FIG. 1 or the method of FIG. 2), an 'on the fly' sorting algorithm may be used such that the M most significant peaks and their positions are identified during the data buffering period. This reduces the processing latency of the methods. The following description of the sorting algorithm relates to a symbol length of 160 samples; it will be appreciated, however, that this is by way of example only and the algorithm may be extended for other symbol lengths.

Figure 4:
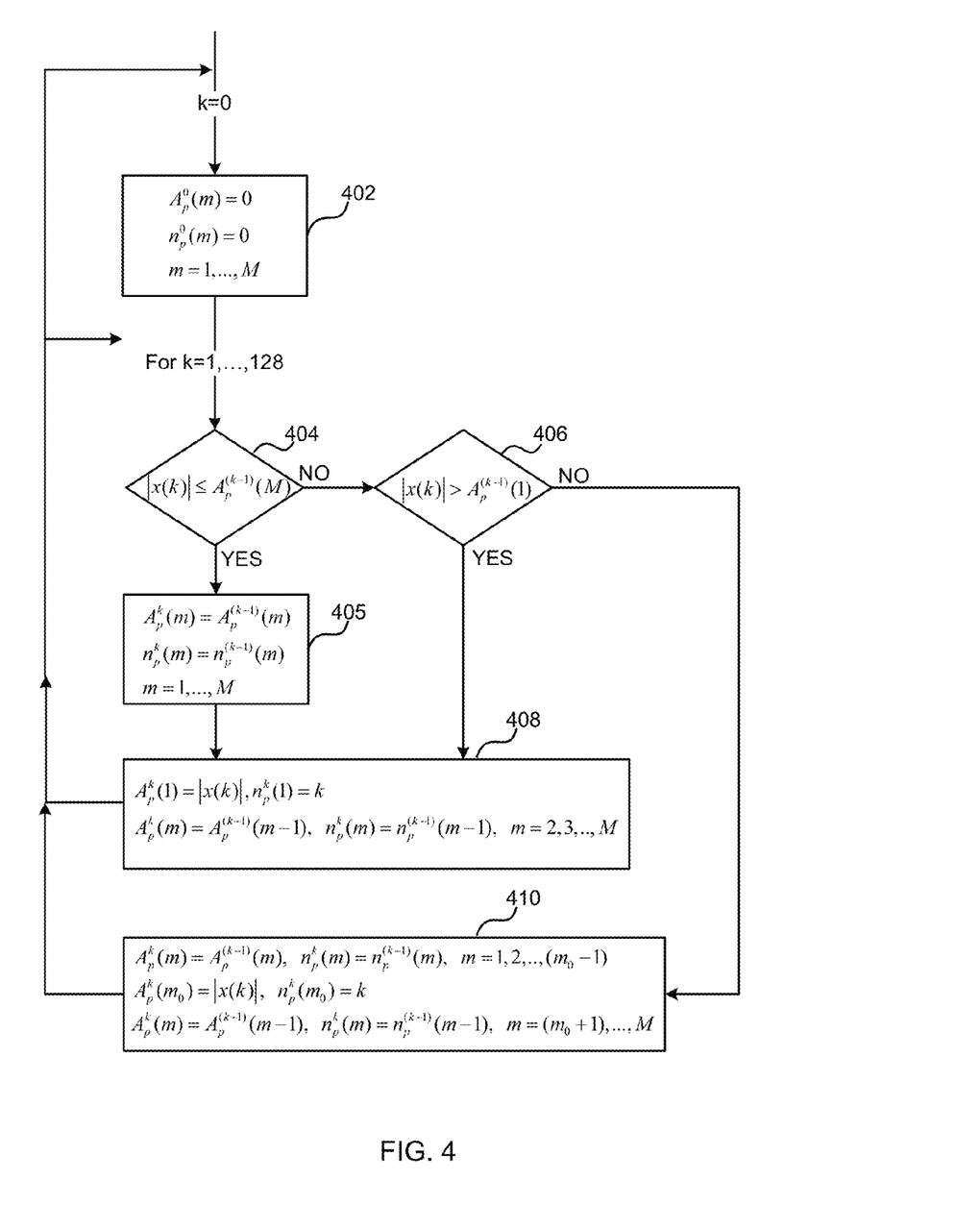
FIG. 4 shows a flow diagram of an example sorting algorithm which may be used to identify the M most significant peaks and their positions.

FIG. 4 shows a flow diagram of an example sorting algorithm which may be used to identify the M most significant peaks and their positions and which may be used before all the samples within a symbol have been buffered (or may in other examples be used once all the samples have been buffered). The method is initialized at the start of each symbol by setting all the stored values to zero (block 402), i.e. the M most significant peaks' values (i.e. amplitudes) $A_p^0(m)=0$, and the peaks' positions $n_p^0(m)=0$, m=1, 2, ..., M.

When the $k^{th}$ sample, x(k), within a symbol is available (k=1, 2, ..., 128), then its amplitude |x(k)| is compared (in blocks 404 and 406) with the stored amplitude values for the M most significant peaks identified so far: $A_p^{(k-1)}(m)$, m=1, 2, ..., M. The peak data (amplitude and position) is stored in an order according to the amplitude of the peak and in the following example, the peak data for the largest of the M identified peaks is stored at position m=1 and the peak data for the smallest of the M identified peaks is stored at position m=M. The parameter, m, may be referred to as a peak index. Based on the results of the comparison, the stored peak data is updated (in blocks 405, 408 and 410) as follows:

If the amplitude of the $k^{th}$ sample is smaller than, or equal to, the smallest of the stored amplitudes, which is stored at position m=M ('Yes' in block 404), i.e. $|x(k)| \leq A_p^{(k-1)}(M)$, then the stored data is not changed (block 405), i.e. $A_p^k(m) = A_p^{(k-1)}(m)$, $n_p^k(m) = n_p^{(k-1)}(m)$, m=1, 2, ..., M;

Otherwise if the amplitude of the $k^{th}$ sample is larger than all of the stored amplitudes ('Yes' in block 406), i.e. $|x(k)| > A_p^{(k-1)}(1)$, then the amplitude and position of the $k^{th}$ sample is stored at position m=1 and the data stored at positions m= 1, ..., M-1 all moves along one position to m=2, ..., M, with the data previously stored at position M being overwritten (block 408), i.e.:

$$A_p{}^k(1)=|x(k)|, n_p{}^k(1)=k$$

$$A_p{}^k(m)=A_p{}^{(k-1)}(m-1), n_p{}^k(m)=n_p{}^{(k-1)}(m-1), m=2, 3, \ldots, M$$

Otherwise if the amplitude of the $k^{th}$ sample is larger than some of the stored amplitudes ('No' in both blocks 404 and 406), i.e. $A_p{}^{(k-1)}(m_0-1)>|x(k)|>A_p{}^{(k-1)}(m_0)$, then the amplitude and position of the $k^{th}$ sample is stored and the peak data having the smallest stored amplitude (stored at position m=M) is not retained (block 410):

$$A_p{}^k(m)=A_p{}^{(k-1)}(m), n_p{}^k(m)=n_p{}^{(k-1)}(m), m=1, 2, \ldots, (m_0-1)$$

$$A_p{}^k(m_0)=|x(k)|, n_p{}^k(m_0)=k$$

$$A_p{}^k(m)=A_p{}^{(k-1)}(m-1), n_p{}^k(m)=n_p{}^{(k-1)}(m-1), m=(m_0+1), \ldots, M$$

It will be appreciated that for the first M samples in a symbol, each sample will comprise one of the M most significant peaks so far and the peak data (amplitude and position) will be stored.

Due to the cyclic shift property of an 802.11n OFDM signal within a symbol, the samples $x(k), k=129, 130, \ldots, 159$ can be ignored in the sorting processing and consequently, at the 129th sample (i.e. k=129), the sorting is stopped; the most significant M peak values and positions for $x(k), k=1, 2, \ldots, 128$ are found. It will be appreciated that other OFDM signals may not have this property and consequently the method may be modified such that the all the appropriate samples are searched to identify the M most significant peaks within a symbol.

The method shown in FIG. 4 identifies the M peaks with the largest amplitude within samples 1-128. As described above, in some examples, other factors (aside from amplitude) may also be involved in determining which peaks are considered most significant. Where the position of the peak within the symbol is a factor, the amplitude may be multiplied by a weight before the comparisons are performed in the method of FIG. 4, where the weight used is dependent upon the position of the sample (e.g. dependent upon the value of k).

Figure 5:
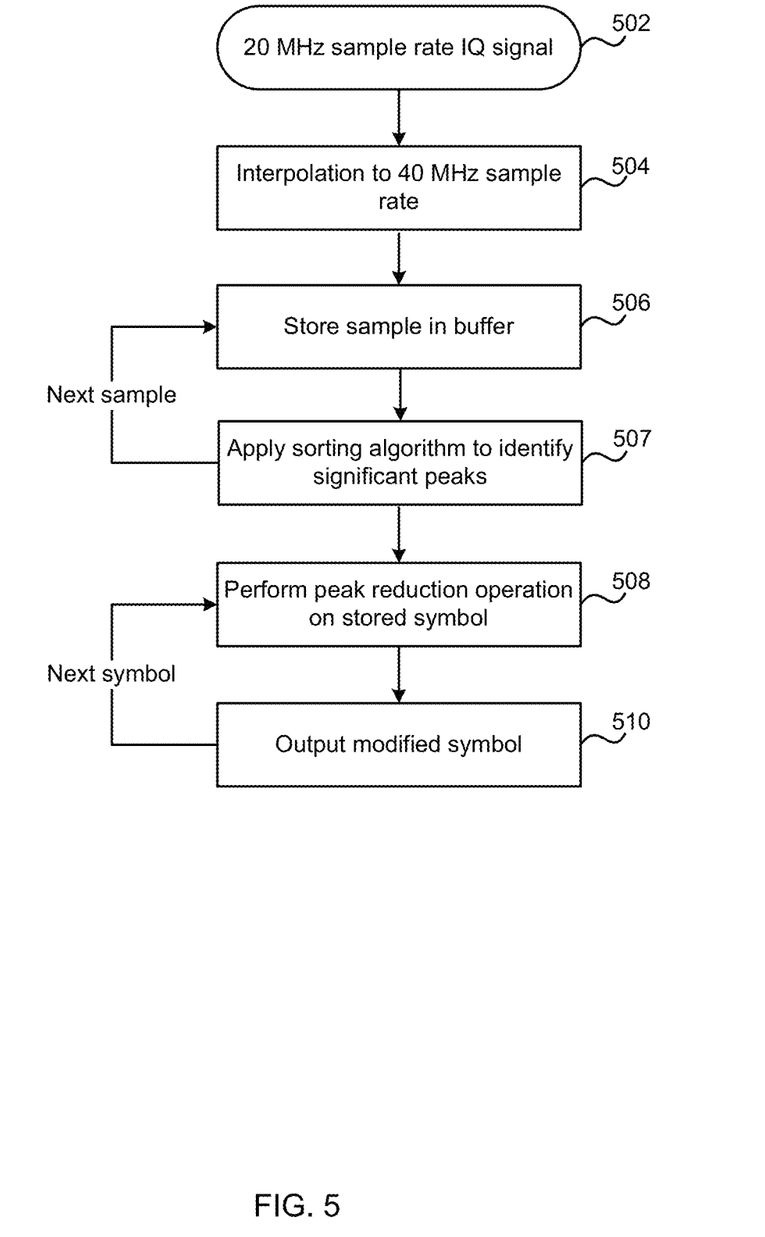
FIG. 5 is a flow diagram of a further example method of peak reduction of an OFDM signal.

FIG. 5 is a flow diagram of a further example method of peak reduction of an OFDM signal. The input signal at 20 MHz sample rate (block 502) is up-sampled to 40 MHz (block 504) and as described above, to minimize ISI, an interpolation filter having a short length, without long ringing, while maintaining the spectral flatness of the original signal with low aliasing, may be used. When one sample from the output of the interpolation filter is received it is put into a FIFO data buffer that is one OFDM symbol in length (block 506). The sample position within the symbol may be determined using a symbol start indicator as a reference. The 'on the fly' sorting algorithm described above is applied (block 507) as each sample is stored to find the M most significant peaks' values and positions. After the data buffer is full, the peak reduction operation can be performed (block 508) on the buffered symbol. For each symbol, the first sample value (k=0) is kept unchanged. For the 2nd-129th samples (k=1, ..., 128) within a symbol, the peak reduction signal for each peak is generated by proper cyclic shift and scaling of the mother cancellation signal as shown in equations (5), (6) and (7). The peak reduction signal for each of the M most significant peaks found in block 507 is subtracted from the input signal to obtain the modified signal. The subtraction may be performed as a single operation (e.g. having summed the peak reduction signals for each of the M peaks) or alternatively M subtractions may be performed. These two options are mathematically equivalent and in other embodiments this step may be performed in other mathematically equivalent ways. For the 130th-160th samples (k=129, ..., 159) within a symbol, extension of the above peak reduction signal by a cyclic shift is carried out before peak signal subtraction.

In the embodiment shown in FIG. 5 and described above, the first sample value of each OFDM symbol is kept unchanged. As a result of the windowing suggested in the 802.11n standard, the first sample of each OFDM sample is a sum of contributions from the current and previous symbols. This means that the sample cannot be cyclically repeated later in the symbol. Additionally, due to the windowing, this first sample has a lower variance than other samples within each OFDM symbol, so it is less likely to be a peak. For example, with the windowing function recommended in 802.11a-1999 section 17.3.2.5, this sample is half the sum of a sample from the previous OFDM symbol and a sample from the current OFDM symbol. Hence, the amplitude of this sample is on average 3 dB smaller than the amplitude of samples not subject to windowing. Furthermore, not reducing the first sample has little or no impact on EVM because receivers typically sample the later part of OFDM symbols. In other embodiments, other windows may be used which may affect more than one sample and the method shown in FIG. 5 may be modified appropriately where required.

The peak reduction algorithm described herein can be run in a pipeline with peak reduction being performed on a symbol by symbol basis. While the current symbol of samples is buffered (in block 506) and the sorting operation is performed (in block 507), the peak cancellation is carried out on the previous symbol (in block 508) and the processing result is output (in block 510). Therefore, the latency is about one symbol.

Figure 6:
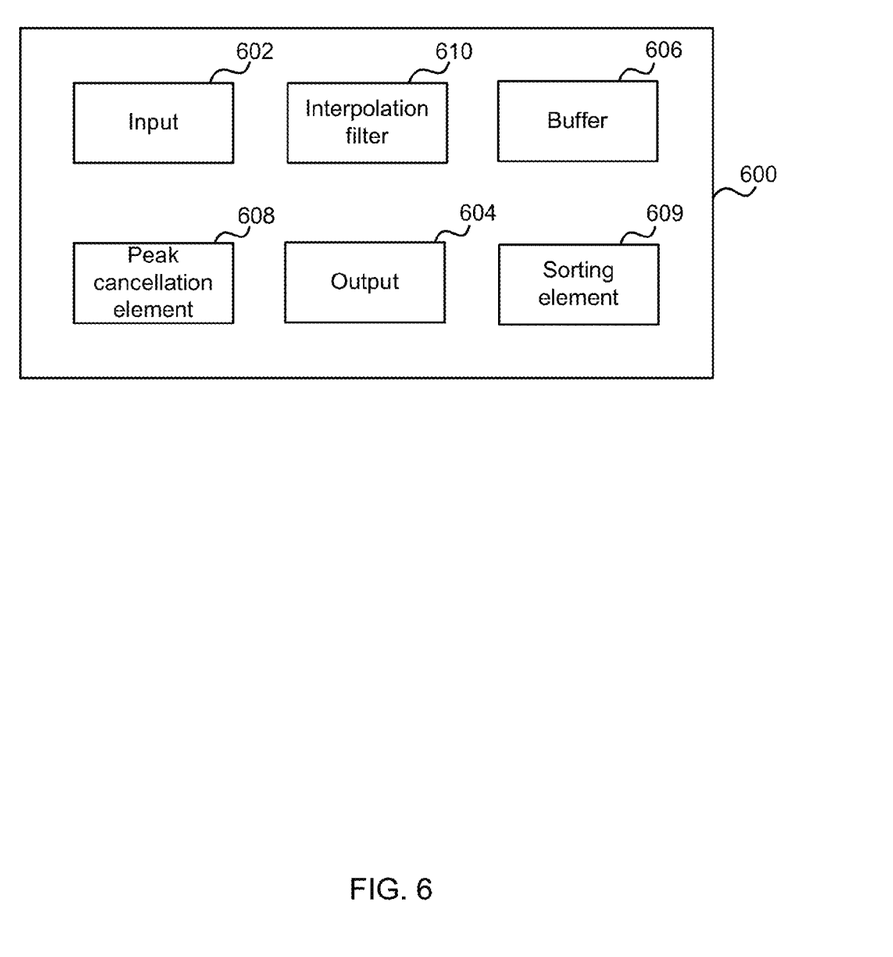
FIG. 6 shows a block diagram of an apparatus for performing peak reduction of an OFDM signal.

FIG. 6 shows a block diagram of an apparatus for performing peak reduction of an OFDM signal. This apparatus may, for example, be an OFDM modem, and it will be appreciated that the modem may comprise other elements and that only those elements that are relevant to performing peak reduction are shown in FIG. 6. Additionally, the functional elements shown in FIG. 6 may be combined together in any manner to form composite elements (e.g. the peak cancellation and sorting elements 608, 609 may be combined into a single processing element).

The apparatus 600 comprises an input 602 for receiving the input signal (which may, for example, be a 20 MHz 802.11n signal) and an output 604 for outputting the resultant modified signal once peak reduction has been performed. The apparatus also comprises a buffer 606 for storing samples and a peak reduction element 608 (which may also be referred to as a processing element) for performing peak reduction by subtracting M shifted and scaled copies of a template cancellation signal. The apparatus further comprises a sorting element 609 arranged to identify the M most significant peaks within a symbol and in an example, this may be done using the 'on the fly' algorithm described above and shown in FIG. 4. In some embodiments, the apparatus 600 may also comprise an interpolation filter 610 (or other element) for up-sampling the received signal (e.g. from 20 MHz to 40 MHz).

Figure 7:
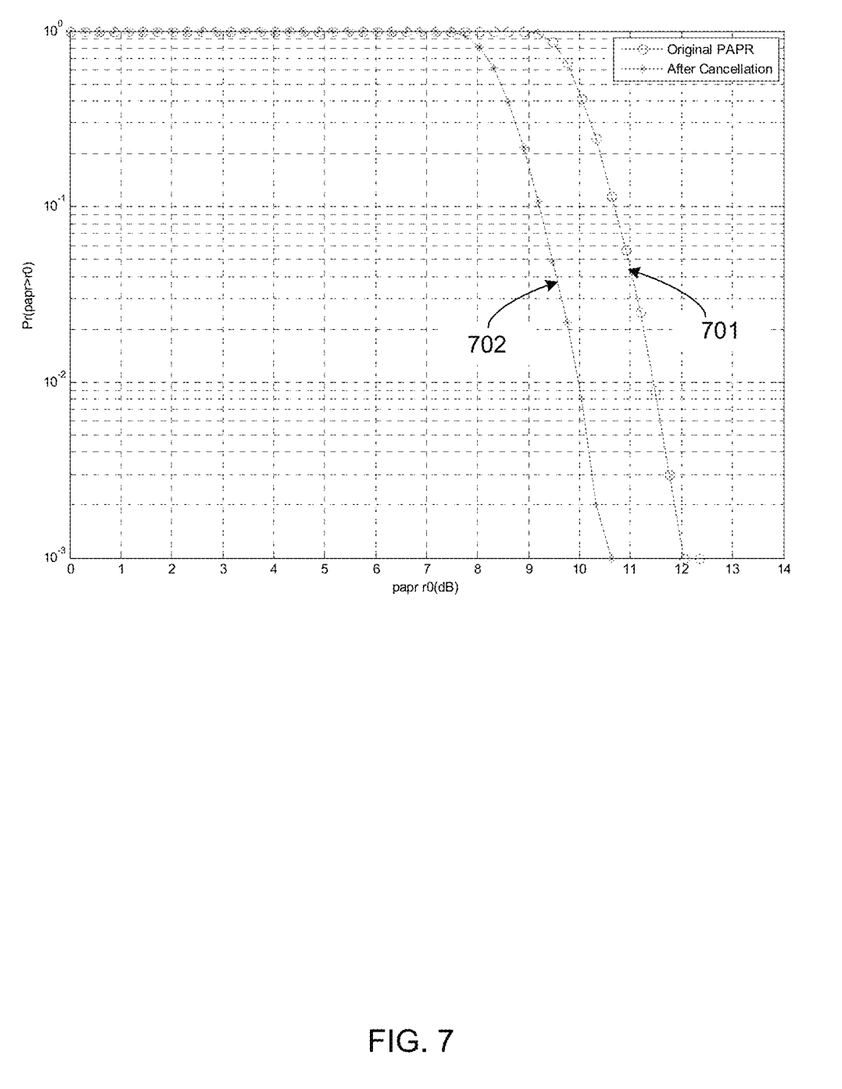
FIGS. 7 and 9 show simulation results obtaining using the methods described herein.

FIG. 7 shows the complementary cumulative distribution function (CCDF) of the PAPR value defined in equation (1) based on a simulation of 1000 packets. The transmitted packets, containing 4000 bytes of random data are HT-MM format, MCS 7, which utilizes 64QAM modulation. The graph comprises one line 701 for the original PAPR and a second line 702 showing the PAPR after peak cancellation and shows that about 1.5 dB PAPR improvement is obtained at $10^{-2}$ CCDF. When PAPR improves, the probability of clipping or serious distortion introduced by power amplifier when input signal envelope is too high is reduced, therefore the EVM performance of transmitter is improved.

Figure 8:
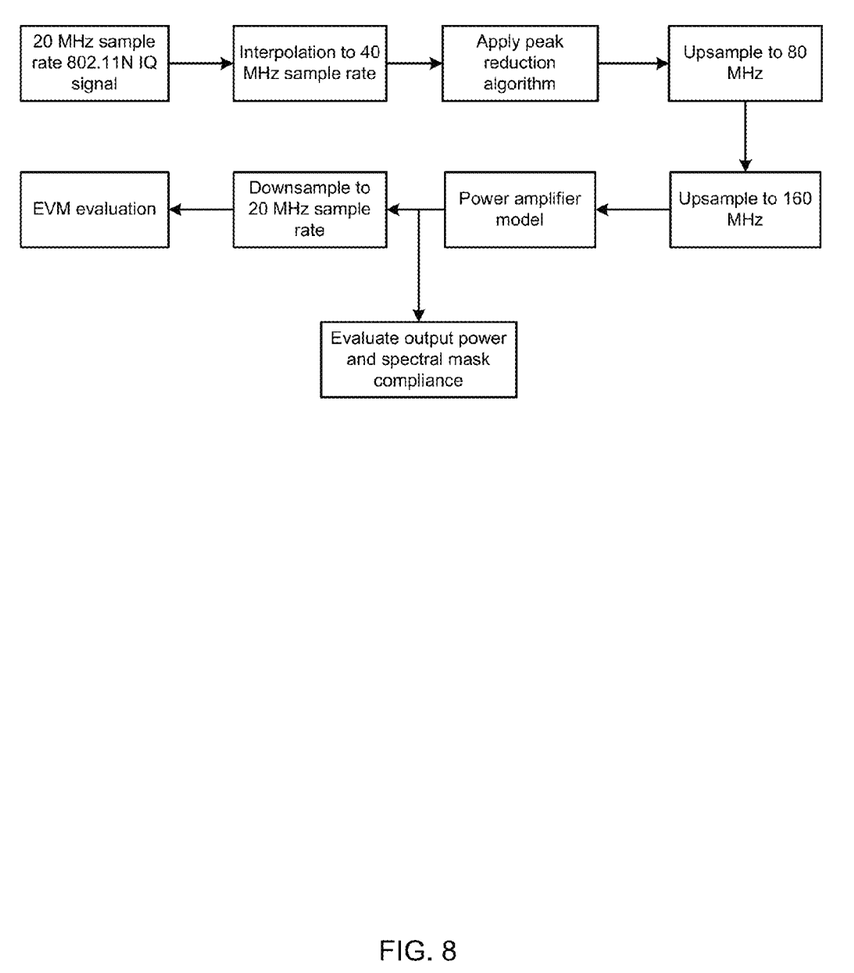
FIG. 8 is a block diagram of a simulation used to generate the results shown in FIG. 9.
Figure 9:
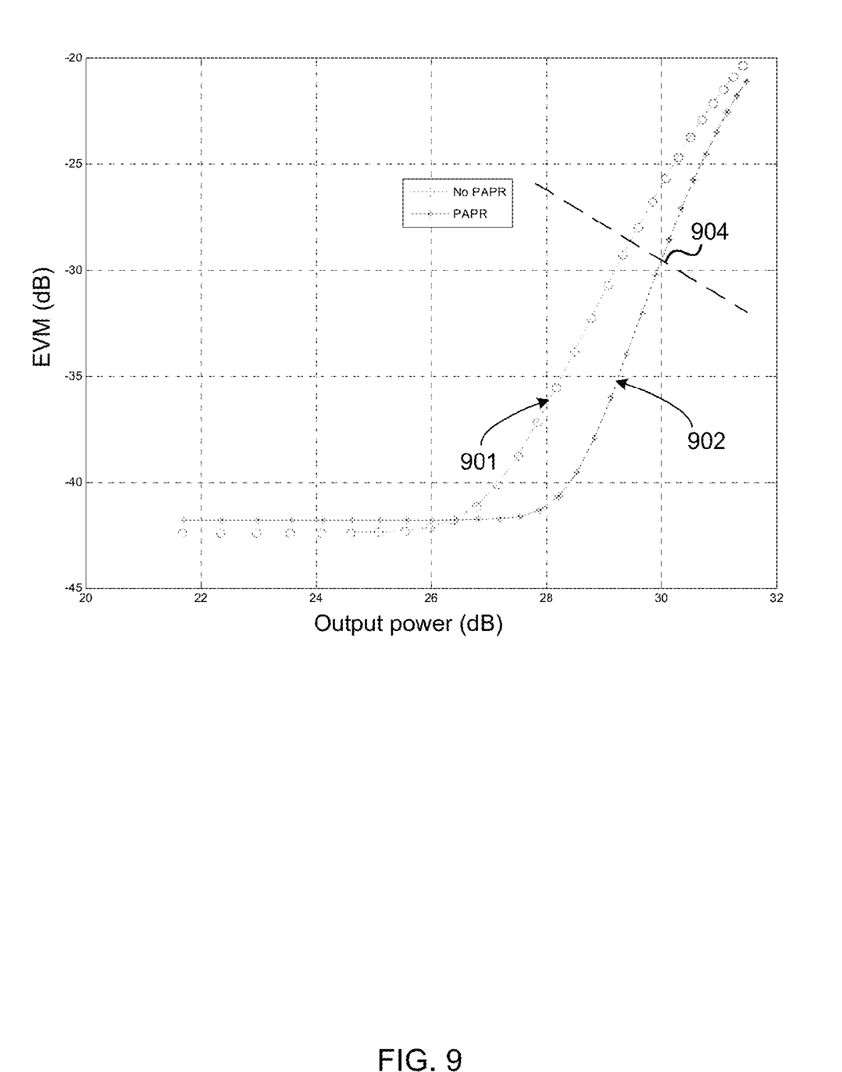

FIG. 8 shows a diagram of the simulation used to evaluate the variation in EVM with output power and spectral mask compliance and the results are shown in FIG. 9 (line 901 is without peak reduction and line 902 is with peak reduction). In the simulation, the power amplifier (PA) is characterized by an ideal limiter: if the signal amplitude is less than a certain threshold, the output signal is equal to the input signal; otherwise the output signal amplitude is completely clipped at the threshold value without changing the phase. It is based on the assumption that digital pre-distortion to a power amplifier can significantly compensate for its nonlinearity. In FIG. 9, the markers below dotted line 904 are compliant with the spectral mask, and the markers above dotted line 904 show violation. The results are based on 50 packets; each packet has 802.11n HT-MM format, MCS 7, containing 4000 bytes of random data. Here, EVM is taken as an average over all symbols of these packets (about 6500 symbols). The output power is only for relative reference to obtain the output power improvement. As shown in FIG. 9, at −40 dB EVM, the output power improvement (the difference in output power corresponding to −40 dB EVM) is about 1.4 dB after applying the proposed algorithm. In other words, under the conditions of this simulation, the proposed algorithm allows a 1.4 dB stronger signal to be transmitted while complying with EVM and spectrum mask requirements. Also, the spectrum mask is complied with when the EVM is below −35 dB.

The methods described above provide an efficient PAPR reduction algorithm with low latency and complexity and the algorithm may, for example, be implemented in an 802.11n OFDM modem. In an embodiment, the use of a pre-computed waveform which is scaled and shifted to cancel multiple peaks without requiring iterative processing contributes to the low latency of the method. The techniques described result in very little in-band distortion due to usage of unused subcarriers which will be filtered out in the receiver and acceptable out-of-band distortion through cancellation waveform design. In simulation, over 1 dB output power improvement is obtained without violating the spectrum mask defined in the 802.11a-1999 or 802.11n-2009 standards, so the power efficiency of power amplifier can be improved.

The examples described above refer to a 20 MHz or 40 MHz bandwidth OFDM signal by way of example only. For example, the proposed algorithms for peak reduction and sorting can be extended to 40 MHz bandwidth 802.11n OFDM signal after proper modification (e.g. modification of the template cancellation signal as described above) and may be further extended to other bandwidth signals (e.g. by modification of the template cancellation signals whilst maintaining the attributes described above). Furthermore, although an optimization shows the input signal being up-sampled (e.g. from 20 MHz to 40 MHz), in other examples, up-sampling may not occur (as shown in FIG. 1) or the signal may be up-sampled by a different amount.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of peak reduction of an OFDM signal, the method comprising:
identifying a plurality of peaks in a symbol of the OFDM signal; for each identified peak, generating a cancellation signal by cyclically shifting a pre-computed cancellation waveform such that a peak of the pre-computed waveform is aligned to the identified peak and scaling a resulting waveform by a complex number such that it has an opposite phase to the identified peak and an amplitude which corresponds to an amplitude of the identified peak; and
generating a modified OFDM signal by subtracting the cancellation signals from the OFDM signal,
wherein the complex number has the form:

$$\alpha(v_p(m)) = \begin{cases} 0 & \text{if } |v_p(m)| \le T_0 \\ \dfrac{v_p(m)}{|v_p(m)|}(|v_p(m)| - T_0) & \text{otherwise} \end{cases}$$

where $v_p(m)$ is a complex value of the identified peak and $T_0$ is a pre-defined threshold.

2. The method according to claim 1, wherein the pre-computed cancellation waveform comprises a signal envelope which decays with increasing distance from the peak of the pre-computed waveform.

3. The method according to claim 2, wherein the pre-computed cancellation waveform comprises two sample values adjacent to the peak, the sample values being substantially equal to zero.

4. The method according to claim 2, wherein the pre-computed cancellation waveform is substantially symmetrical about the peak.

5. The method according to claim 1, wherein the pre-computed cancellation waveform comprises a DC component.

6. The method according to claim 1, further comprising:
up-sampling the OFDM signal before identifying the plurality of peaks and wherein the modified OFDM signal is generated by subtracting the cancellation signals from the up-sampled OFDM signal.

7. The method according to claim 1, wherein the at lest one peak plurality of peaks comprises a set of M most significant peaks in the symbol, where M is an integer.

8. The method according to claim 7, wherein identifying the set of M most significant peaks in the symbol comprises:
on receipt of a sample from the symbol, comparing an amplitude of the sample with stored data, the stored data comprising an amplitude, sample position and index for each of M peaks, wherein the index defines an order of the M peaks according to the amplitude of each of the peaks; and
if the amplitude of the sample is larger than one or more stored values, deleting the stored data for the one of the M peaks having the smallest amplitude, storing the amplitude of the sample and sample position and updating the index for each of the stored peaks.

9. The method according to claim 8, further comprising:
storing the sample in a buffer;
and wherein the cancellation signals are generated once all samples from the symbol have been received and stored in the buffer.

10. The method according to claim 1, wherein the OFDM signal comprises one of a 20 MHz bandwidth 802.11n OFDM signal and a 40 MHz bandwidth 802.11n OFDM signal.

11. The method according to claim 1, wherein the OFDM signal comprises a 20 MHz bandwidth 802.11n OFDM signal and wherein the pre-computed cancellation waveform in the time domain is defined by:

$$h(k) = \sum_{m=1}^{128} H(m) \exp\left(j \frac{2\pi}{128}(k-1)(m-65)\right)$$

where:

$$H(m) = \begin{cases} 1 & m = 1 \\ 10^{0.045 A\left(\frac{20}{64}(m-1)\right)} & 31 \leq m \leq 50 \\ 10^{0.045 A\left(\frac{20}{64}(m-129)\right)} & 80 \leq m \leq 99 \\ 0 & \text{otherwise} \end{cases}$$

and where $j=\sqrt{-1}$, A is a spectrum mask of an 802.11n 20 MHz bandwidth signal, m is a subcarrier number and k is a sample number in the symbol.

12. A method of peak reduction of an OFDM signal, the method comprising:
identifying a plurality of peaks in a symbol of the OFDM signal;
for each identified peak, generating a cancellation signal by cyclically shifting a pre-computed cancellation waveform such that a peak of the pre-computed waveform is aligned to the identified peak and scaling a resulting waveform by a complex number such that it has an opposite phase to the identified peak and an amplitude which corresponds to an amplitude of the identified peak; and
generating a modified OFDM signal by subtracting the cancellation signals from the OFDM signal, wherein a division operation performed in calculating the complex number is approximated by a set of ratios, such that the complex number has the form:

$$\alpha(v_p(m)) = \begin{cases} 0 & \text{if } |v_p(m)| \leq T_0 \\ r_i v_p(m) & \text{if } (T_0 + (i-1)\Delta T) < |v_p(m)| \leq (T_0 + i\Delta T) \quad 1 \leq i \leq (K-1) \\ r_K v_p(m) & \text{otherwise} \end{cases}$$

where $v_p(m)$ is a complex value of the identified peak, $T_0$ is a predefined threshold $(r_i | 1 \leq i \leq K)$ are piecewise constant approximations of $$\frac{|v_p(m)| - T_0}{|v_p(m)|},$$

K is a number of approximations and $\Delta T$ is a step size.

13. An apparatus for peak reduction of an OFDM signal, the apparatus comprising:
a sorting element arranged to identify a plurality of peaks in a symbol of a received OFDM signal; a processing element arranged to generate a cancellation signal for each identified peak by cyclically shifting a pre-computed cancellation waveform such that a peak of the pre-computed waveform is aligned to the identified peak and scaling a resulting waveform by a complex number such that it has an opposite phase to the identified peak and an amplitude which corresponds to an amplitude of the identified peak; and further arranged to generate a modified OFDM signal by subtracting the cancellation signals from the received OFDM signal; and
an output arranged to output the modified OFDM signal, wherein the complex number has the form:

$$\alpha(v_p(m)) = \begin{cases} 0 & \text{if } |v_p(m)| \leq T_0 \\ \frac{v_p(m)}{|v_p(m)|}(|v_p(m)| - T_0) & \text{otherwise} \end{cases}$$

where $v_p(m)$ is a complex value of the identified peak and $T_0$ is a pre-defined threshold.

14. The apparatus according to claim 13, further comprising an interpolation filter arranged to up-sample an input OFDM signal and output an up-sampled OFDM signal to the sorting and processing elements and wherein the received OFDM signal is the up-sampled OFDM signal.

15. An OFDM modem comprising the apparatus according to claim 13.

16. An apparatus for peak reduction of an OFDM signal, the apparatus comprising:
a sorting element arranged to identify a plurality of peaks in a symbol of a received OFDM signal;
a processing element arranged to generate a cancellation signal for each identified peak by cyclically shifting a pre-computed cancellation waveform such that the peak of the pre-computed waveform is aligned to the identified peak and scaling a resulting waveform complex number such that it has an opposite phase to the identified peak and an amplitude which corresponds to an amplitude of the identified peak; and further arranged to generate a modified OFDM signal by subtracting the cancellation signals from the received OFDM signal; and an output arranged to output the modified OFDM signal, wherein a division operation performed in calculating the complex number is approximated by a set of ratios, such that the complex number has the form:

$$\alpha(v_p(m)) = \begin{cases} 0 & \text{if } |v_p(m)| \le T_0 \\ r_i v_p(m) & \text{if } (T_0 + (i-1)\Delta T) < |v_p(m)| \le (T_0 + i\Delta T) \quad 1 \le i \le (K-1) \\ r_K v_p(m) & \text{otherwise} \end{cases}$$

where $v_p(m)$ is a complex value of the identified peak, $T_0$ is a predefined threshold ($r_i | 1 \le i \le K$) are piecewise constant approximations of $$\frac{|v_p(m)| - T_0}{|v_p(m)|},$$

K is a number of approximations and $\Delta T$ is a step size.

17. A method of peak reduction of a 20 MHz bandwidth 802.11n OFDM signal, the method comprising:

identifying a plurality of peaks in a symbol of the OFDM signal;

for each identified peak, generating a cancellation signal by shifting and scaling a pre-computed cancellation waveform; and generating a modified OFDM signal by subtracting the cancellation signals from the OFDM signal, and wherein the pre-computed cancellation waveform in the time domain is defined by:

$$h(k) = \sum_{m=1}^{128} H(m) \exp\left(j \frac{2\pi}{128}(k-1)(m-65)\right)$$

where:

$$H(m) = \begin{cases} 1 & m = 1 \\ 10^{0.045 A\left(\frac{20}{64}(m-1)\right)} & 31 \le m \le 50 \\ 10^{0.045 A\left(\frac{20}{64}(m-129)\right)} & 80 \le m \le 99 \\ 0 & \text{otherwise} \end{cases}$$

and where $j=\sqrt{-1}$, A is a spectrum mask of the 802.11n 20 MHz bandwidth signal, m is a subcarrier number and k is a sample number in the symbol.

* * * * *